United States Patent [19]

Schoubye

[11] Patent Number: 5,639,288

[45] Date of Patent: Jun. 17, 1997

[54] METHOD FOR FURNISHING GLASS TUBE WITH INTERNAL GLASS SPIRAL

[75] Inventor: Peter Schoubye, Hørsholm, Denmark

[73] Assignee: Haldor Topsoe A/S, Copenhagen, Denmark

[21] Appl. No.: 575,990

[22] Filed: Dec. 21, 1995

[30] Foreign Application Priority Data

Dec. 22, 1994 [DK] Denmark ............................ 1473/94
Dec. 30, 1994 [DK] Denmark ............................ 1499/94

[51] Int. Cl.⁶ .......................... C03B 23/057; C03B 23/13
[52] U.S. Cl. ........................ 65/55; 65/57; 65/109
[58] Field of Search ........................ 65/55, 57, 109, 65/120, 271

[56] References Cited

U.S. PATENT DOCUMENTS

| 1,926,552 | 9/1933 | Morgan | 65/55 |
| 3,186,820 | 6/1965 | Adkins | 65/271 |
| 3,837,830 | 9/1974 | Eberhart | 65/54 |

FOREIGN PATENT DOCUMENTS 26746 of 1901 United Kingdom .

*Primary Examiner*—Donald E. Czaja
*Assistant Examiner*—Sean Vincent
*Attorney, Agent, or Firm*—Ostrolenk, Faber, Gerb & Soffen, LLP

[57] ABSTRACT

A method to provide a glass tube with an internal glass spiral being formed from a straight glass rod and fastened to the internal wall of the glass tube by merging the glass rod with the glass wall in the line of contact between the glass wall and the spiral wherein the glass rod is conducted into the glass tube through a guiding tube placed inside the glass tube at a velocity $v_1$ relative to the guiding tube, the guiding tube being provided with a heating zone at its front end inside the glass tube, the glass rod being heated to its softening point in the heating zone before leaving the guiding tube through a mouth piece, at the same time the glass tube and/or the guiding tube being rotated at a frequency n, and the glass tube being moved at a velocity $v_2$ relative to the guiding tube.

13 Claims, 1 Drawing Sheet

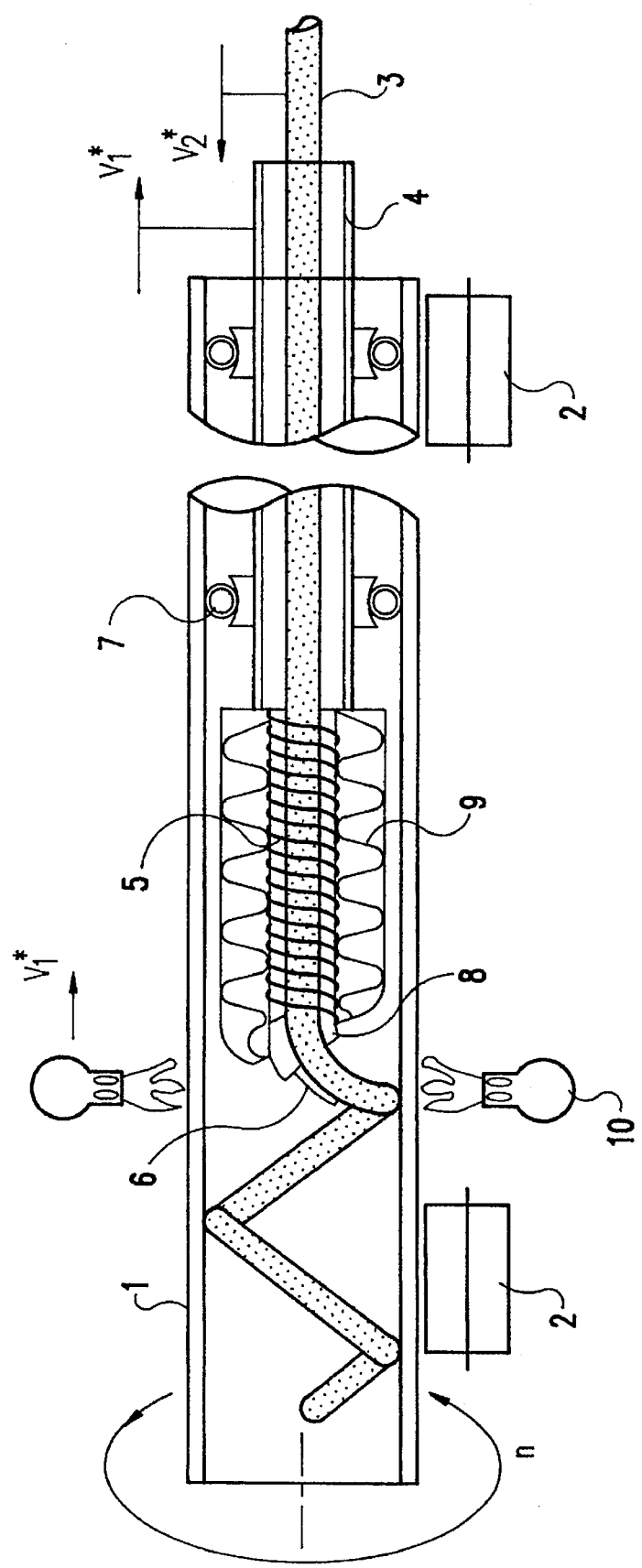

METHOD FOR FURNISHING GLASS TUBE WITH INTERNAL GLASS SPIRAL

BACKGROUND OF THE INVENTION

1. Field of the Invention

The present invention relates to a method of providing a glass tube to be used in tubular gas-gas heat exchangers with a glass spiral on the inside wall of the tube in order to increase the heat transfer efficiency of the heat exchanger.

2. Description of the Related Art

A glass tube for use in heat exchangers has an inside diameter, ID, of typically about 25-60 mm. The diameter of the spiralized glass rod or thread is typically about 1-12 mm. The spiral is fully or partly melted on to the inside glass wall and has a pitch height of typically 2-10 times of the ID. The glass tube can have lengths of up to 250 times of the ID, and its wall thickness is typically 5 to 8% of the ID.

SUMMARY OF THE INVENTION

The present invention is a method to provide a glass tube of the above type with an internal glass spiral being formed from a straight glass rod and fastened to the internal wall of the glass tube by merging the glass rod with the glass wall in the line of contact between the glass wall and the spiral wherein the glass rod is conducted into the glass tube through a guiding tube placed inside the glass tube at a velocity $v_1$ relative to the guiding tube, the guiding tube being provided with a heating zone at its front end inside the glass tube, the glass rod being heated to its softening point in the heating zone before leaving the guiding tube through a mouth piece, at the same time the glass tube and/or the guiding tube being rotated at a frequency n, and the glass tube being moved at a velocity $v_2$ relative to the guiding tube.

BRIEF DESCRIPTION OF THE DRAWING

FIG. 1 illustrates a method of forming a glass tube according to a preferred embodiment of the present invention.

DETAILED DESCRIPTION OF THE INVENTION

The spiral is installed in the glass tube as shown in FIG. 1: A glass tube 1 is placed horizontally on rollers 2 from which it can be rotated. A glass rod (or glass tube) 3 is inserted into glass tube 1 through a guiding tube 4 placed inside glass tube 1. The end of guiding tube 4 is provided with a heated zone 5, in which the glass rod, when pushed through the guiding tube, is heated to its softening point, at which point it can be bent towards the inner wall of glass tube 1, either by gravity force or by force applied by a guiding vane 6 mounted on the exit of the heated zone. When the glass rod is pushed through the guiding tube at a velocity $v_1$ relative to the latter, at the same time as either the glass tube or the guiding tube is rotated at a frequency of n times per minute and the guiding tube is moved at a velocity $v_2$ relative to the glass tube, the glass rod will lie down on the inside wall of the glass tube, forming a spiral with a pitch height determined by the values chosen for $v_1$, $v_2$ and n. The values of $v_1$ and $v_2$ give the pitch height and the value of n required (when ID of the glass tube and the diameter of the rod are given). However, as the softened rod can be stretched by up to 10-20%, the values of $v_1$, $v_2$ and n do not have to be entirely synchronized. The spiral will adhere to the glass tube wall by melting, at least spotwise, on the line of contact, when the glass tube is heated outside, for example by a ringburner 10 outside the glass tube at a position of the tip of the heated zone of the guiding tube. The outside heating, followed by slow cooling of the tube, also secures relaxation of thermal tensions in the glass tube and the spiral.

The mouth piece of guiding tube 4 may be placed in the center of the glass tube and is kept in a desired radial position by roller bearings 7. Mouth piece 8 and its guiding vane 6 may further be bent in an angle relative to glass tube 1 corresponding to the angle of the spiral, thereby, the spiral is correctly laid down on the glass tube wall.

Heating zone 5 for heating the glass rod may be constructed as further shown in FIG. 1. The heating zone is an extension 5 of the guiding tube and made of high temperature steel alloy, alumina or another high temperature resistant material that does not stick to the glass rod at its softening temperature. Tube 5 may be heated electrically according to known principles for the construction of small electric furnaces, for example by electric resistance wiring 9 around the tube.

Alternatively, the glass rod may be heated to its softening point by one or more burners inserted in the glass tube together with the guiding tube.

A glass tube may be used instead of a solid glass rod for making glass spirals as described above.

In an alternative version of the invention, the glass rod is heated to the melting point of the glass (1000–1100° C. for boron silicate glasses) in heating zone 5, whereby it is extruded down onto the glass wall.

Although the present invention has been described in relation to particular embodiments thereof, many other variations and modifications and other uses will become apparent to those skilled in the art. Therefore, the present invention is to be limited not by the specific disclosure herein, but only by the appended claims.

I claim:

1. A method of providing a glass tube with an internal glass spiral being formed from a glass rod and fastened to the internal wall of the glass tube by merging the glass rod with the internal glass wall in the line of contact between the internal glass wall and the spiral, the method comprising the steps of:

placing a guiding tube inside the glass tube;

conducting the glass rod into the glass tube through the guiding tube placed inside the glass tube, the glass rod being conducted at a first velocity relative to the guiding tube;

providing a heating zone at a front end of the guiding tube and inside the glass tube;

heating the glass rod to at least its softening point in the heating zone;

rotating the glass tube with respect to the guiding tube; and moving the glass tube relative to the guiding tube.

2. The method of claim 1, wherein the glass rod is hollow.

3. The method of claim 1, further comprising the step of heating an external surface of the glass tube.

4. The method of claim 1, wherein merging the glass rod with the internal wall of the glass tube comprises forcing the glass rod toward the internal wall.

5. The method of claim 4, wherein the glass tube is forced toward the internal wall using a guiding vane.

6. The method of claim 4, wherein the glass tube is forced toward the internal wall using gravity.

7. The method of claim 1, wherein the step of heating the glass rod to at least its softening point comprises heating the glass rod to its melting point.

8. A method for providing a glass tube with an internal glass spiral, the method comprising the steps of:
   (a) conducting a glass rod through a heating zone inside the glass tube;
   (b) heating the glass rod to at least its softening point; and
   (c) merging the glass rod with an internal wall of the glass tube with relative rotation between the glass tube and the glass rod.

9. The method of claim 8, wherein the glass rod is hollow.

10. The method of claim 8, wherein the step of merging the glass rod with the internal wall of the glass tube comprises forcing the glass rod toward the internal wall.

11. The method of claim 10, wherein the glass tube is forced toward the internal wall using a guiding vane.

12. The method of claim 10, wherein the glass tube is forced toward the internal wall using gravity.

13. The method of claim 8, further comprising the step of heating an external surface of the glass tube.

* * * * *